United States Patent [19]
Bailey

[11] Patent Number: 5,687,938
[45] Date of Patent: *Nov. 18, 1997

[54] ADJUSTABLE PIPE BRACE

[76] Inventor: Michael E. Bailey, 1846 Rosemead, #250, Carrollton, Tex. 75007

[*] Notice: The term of this patent shall not extend beyond the expiration date of Pat. No. 5,566,916.

[21] Appl. No.: 611,197

[22] Filed: Mar. 5, 1996

Related U.S. Application Data

[63] Continuation-in-part of Ser. No. 452,354, May 26, 1995, Pat. No. 5,566,916.

[51] Int. Cl.⁶ ........................... F16L 3/22
[52] U.S. Cl. ............... 248/74.1; 24/277; 248/74.4; 248/291.1
[58] Field of Search ............... 248/74.1, 65, 74.4, 248/230.1, 230.5, 539, 291.1, 218.4, 219.4; 24/277

[56] References Cited

U.S. PATENT DOCUMENTS

| | | | |
|---|---|---|---|
| 3,129,914 | 4/1964 | Wedge | 248/230.1 X |
| 3,347,572 | 10/1967 | Pfaff, Jr. et al. | 248/230.1 X |
| 3,524,627 | 8/1970 | Boyanton et al. | 248/230.5 X |
| 3,711,050 | 1/1973 | Case | 248/74.4 |
| 3,936,684 | 2/1976 | Anselmino et al. | 248/74.4 X |
| 4,063,700 | 12/1977 | Brewer | 24/277 X |
| 4,167,033 | 9/1979 | Fletcher | 248/230.1 X |
| 5,566,916 | 10/1996 | Bailey | 248/74.4 X |

FOREIGN PATENT DOCUMENTS

| | | | |
|---|---|---|---|
| 1546840 | 11/1968 | France | 248/74.4 |

*Primary Examiner*—Alvin C. Chin-Shue
*Assistant Examiner*—Derek J. Berger
*Attorney, Agent, or Firm*—H. Dennis Kelly; Timmons & Kelly

[57] ABSTRACT

A curved pipe is connected to a support surface with a pair of U-bolt assemblies. One assembly supports the vertical portion of the pipe and the other supports the horizontal portion. Each of the U-bolt assemblies has a U-bolt, a clamp bracket, and a support bracket. The support bracket is connected to a support surface. One or both of the assemblies may also include a pair of spade bolts and a hinge for spacing the support plate away from the support surface.

12 Claims, 3 Drawing Sheets

ADJUSTABLE PIPE BRACE

CROSS REFERENCE TO RELATED APPLICATION

This a continuation-in-part of application Ser. No. 08/452,354, filed May 26, 1995, now U.S. Pat. No. 5,566,916.

BACKGROUND OF THE INVENTION

1. Field of the Invention

This invention relates in general to braces for securing an antenna to a support surface. In particular, the invention relates to adjustable pipe braces for bracing an antenna pole against the eave or the side of a house.

2. Description of Related Art

For many years television antennas have been mounted on the tops of poles. The poles might be mounted on top of a house, or inserted into the ground near the house. If the pole is inserted into the ground, the pole might be braced against the eave or the side of the house to stabilize the pole.

With the advent of cable television, antenna poles became less numerous; however, the subsequent invention of satellite television caused a revival of antenna poles and the attendant technology. In fact, since satellite antennas are more directional than television antennas, it became even more important to properly brace the pole, to keep the antenna from moving in the wind.

Art adjustable brace was required, because the installer never knew whether the pole would be braced against the house or against an eave. Further, different eaves have different slopes. U.S. Pat. No. 4,755,830, issued Jul. 5, 1988, to Plunk, discloses an adjustable pipe brace for securing a pole to a support surface. The assembly includes a circular ring, attached to a base bracket. The base bracket can be attached to the support surface, and the ring can be pivoted to match the axis of the pole.

If the antenna can be connected and supported on the eave or the side of the house, the need for a tall pole can be eliminated. Thus, the antenna can be better supported, at less cost.

SUMMARY OF THE INVENTION

The general object of the pipe brace of the invention is to secure a pipe or a pole to a support surface. In general, this object is accomplished by a curved section of pipe and two U-bolt assemblies. Each U-bolt assembly includes a U-bolt, a clamp bracket, a pair of nuts for securing the U-bolt to the wings of the clamp bracket, a support plate, a nut and a bolt for bolting the base of the clamp bracket to the support plate, and a pair of screws for connecting the support plate to a support surface. One of the U-bolt assemblies supports the vertical portion of the curved pipe, and the other U-bolt assembly supports the horizontal portion of the curved pipe. The antenna can then be placed into the vertical portion of the pipe.

In some cases, one or both of the U-bolt assemblies may also have a pair of spade bolts and a hinge to connect the support plate to the support surface. The spade bolts space the support plate away from the support surface, in order to avoid obstructions.

The above, as well as additional objects, features, and advantages of the invention will become apparent in the following detailed description.

DESCRIPTION OF THE PREFERRED EMBODIMENT

Figure 1:
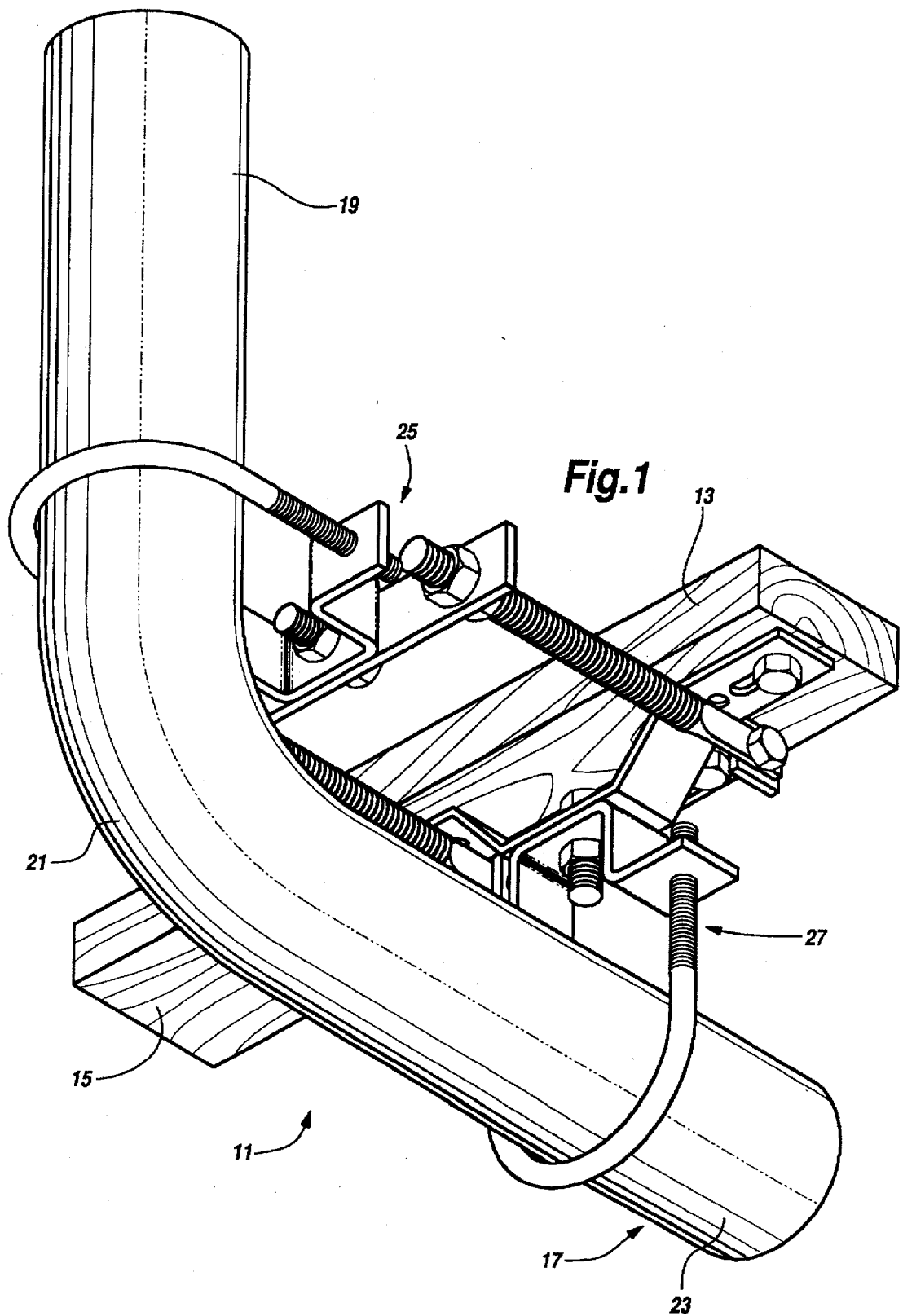
FIG. 1 is a perspective view of an adjustable pipe brace according to the invention, in use to secure an antenna to a house.

For the sake of clarity, FIG. 1, shows the pipe brace 11 of the invention attached to a small board 13. The board 13 provides a support surface 15 for the pipe brace 11, and could be nailed to an eave or the side of a house. Similarly, the pipe brace 11 could, in some cases, be connected directly to the eave or the side of the house.

The pipe brace 11 of the invention includes a pipe 17 having a vertical portion 19, a curved portion 21, and a horizontal portion 23. The pipe 17 may have an outer diameter and an inner diameter sufficient to allow a typical antenna pole to be place into the vertical portion 19 of the pipe 17.

The pipe brace 11 also includes two U-bolt assemblies 25 and 27. The first U-bolt assembly 25 supports the vertical portion 19 of the pipe 17, and the second U-bolt assembly 27 supports the horizontal portion 23 of the pipe 17.

Figure 2:
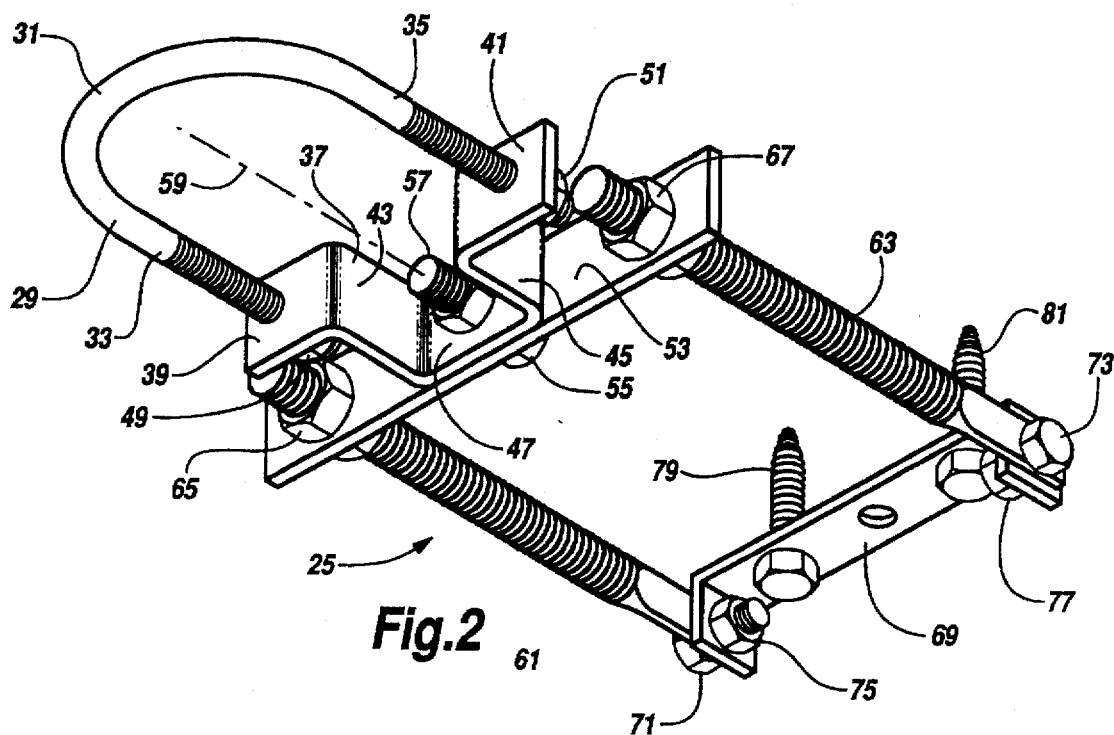
FIG. 2 is a close-up perspective of one of the U-bolt assemblies including the spade bolts and hinge.

As shown in FIG. 2, the first U-bolt assembly 25 includes a U-bolt 29, having a bight 31 between a pair of legs 33 and 35. Each of the legs 33 and 35 has external threads, as shown.

The U-bolt 29 is attached to a clamp bracket 37. The clamp bracket 37 has a pair of wings 39 and 41, a pair of extension plates 43 and 45, and a base 47. The wings 39 and 41 are coplanar, and the legs 33 and 35 of the U-bolt 29 pass through holes in the wings 39 and 41. Nuts 49 and 51 on the threaded ends of the legs 33 and 35 secure the U-bolt 29 to the clamp bracket 37. The nuts 49 and 51 can be adjusted to hold pipe of various diameters. The holes in the wings 39 and 41 may be slotted to allow use of U-bolts 29 of various sizes.

Each of the wings 39 and 41 of the clamp bracket 37 is attached to one end of one of the extension plates 43 and 45. The other end of each extension plate 43 and 45 is attached to the base 47. The base 47 is parallel to the plane of the wings 39 and 41, and the extension plates 43 and 45 extend between the base 47 and the wings 39 and 41 at an acute angle.

The base 47 of the clamp bracket 37 is bolted to a support plate 53 with a bolt 55 and a nut 57. The bolt 55 passes through a slotted hole in the support plate 53. When the nut 57 is loosened, the clamp bracket 37 can be adjusted left or right, and can pivot about the longitudinal axis 59 of the bolt 55. The nut 57 can then be tightened to secure the clamp bracket 37 to the support plate 53 at the selected angle.

The support plate 53 is a flat, rectangular plate, and has a hole near each end. A pair of spade bolts 61 and 63 pass through the holes near the ends of the support plate 53, and are secured with nut pairs 65 and 67. The spade bolts 61 and 63 are threaded along substantially their entire length, so that the nut pairs 65 and 67 can be adjusted to virtually any point along the length of the spade bolts 61 and 63. The spade bolts 61 and 63 are parallel, and thus the distal ends of the spade bolts 61 and 63 are spaced apart.

A hinge 69 extends between the distal ends of the spade bolts 61 and 63. The hinge 69 is bolted to each spade bolt 61 and 63 with bolts 71 and 73 and nuts 75 and 77. The bolts 71 and 73 are collinear, and pass through holes in the ends of the hinge 69. When the nuts 75 and 77 are loosened, the hinge 69 can pivot about the axis of the bolts 71 and 73.

A pair of screws 79 and 81 pass through holes in the hinge 69, and attach the hinge 69 to a support surface 15, such as the board 13 shown in FIG. 1. Since the hinge 69 can be pivoted, the support surface 15 may be horizontal, vertical, or at another angle to the horizontal.

Figure 3:
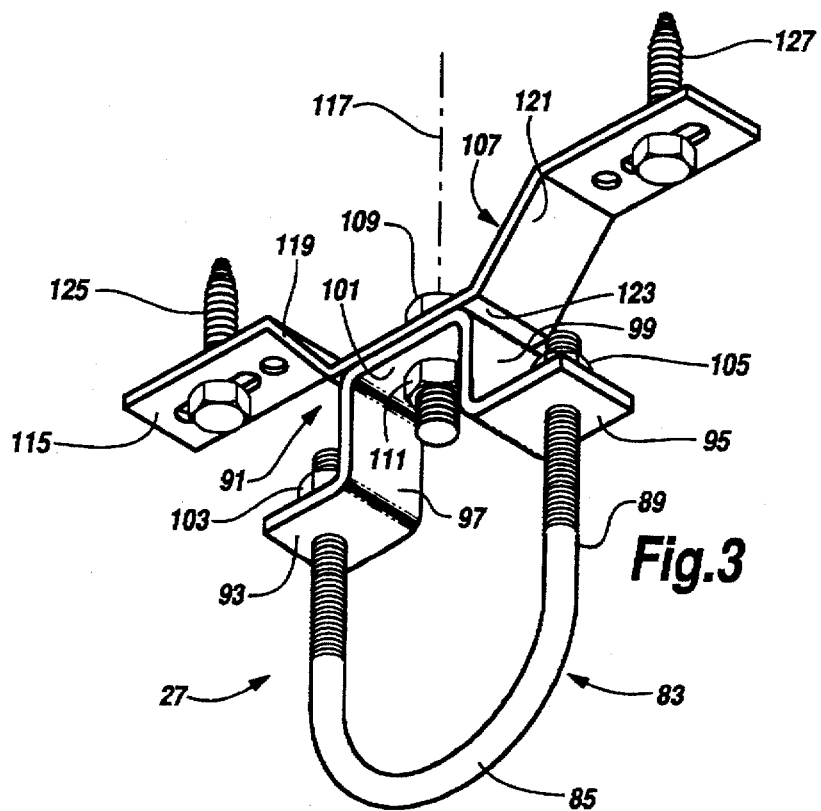
FIG. 3 is a perspective view of one of the U-bolt assemblies, lacking the spade bolts and hinge.

As shown in FIG. 3, the second U-bolt assembly 27 has many components that are similar to components in the first U-bolt assembly 25. The second U-bolt assembly 27 has a U-bolt 83 having a bight 85 between a pair of legs 87 and 89. Each of the legs 87 and 89 has external threads, as shown.

The second U-bolt 83 is attached to a second clamp bracket 91. The second clamp bracket 91 has a pair of wings 93 and 95, a pair of extension plates 97 and 99, and a base 101. The wings 93 and 97 are coplanar, and the legs 87 and 89 of the second U-bolt 83 pass through holes in the wings 93 and 95. Nuts 103 and 105 on the threaded ends of the legs 87 and 89 secure the U-bolt 83 to the clamp bracket 91. The nuts 103 and 105 can be adjusted to hold pipe of various diameters. The holes in the wings 93 and 95 may be slotted to allow use of U-bolts 83 of various sizes.

The base 101 of the second clamp bracket 91 is bolted to a second support plate 107 with a bolt 109 and a nut 111. The bolt 109 passes through a slotted hole in the support plate 107. When the nut 111 is loosened, the clamp bracket 91 can be adjusted left or right, and can pivot about the longitudinal axis 113 of the bolt 109. The nut 111 can then be tightened to secure the clamp bracket 91 to the support plate 107 at the selected angle.

The second support plate 107 is slightly different from the first support plate 53. The second support plate 107 has a pair of wings 115 and 117, a pair of extension plates 119 and 121 attached to the wings 115 and 117, and a base 123 attached between the extension plates 119 and 121. The wings 115 and 117 are parallel to the base 123, and the extension plates 119 and 121 extend between the wings 115 and 117 and the base 123 at an obtuse of angle of 135 degrees.

The second support plate 107 has a pair of screws 125 and 127 for connecting the second support plate 107 to the support surface 15, as shown in FIG. 1. The screws 125 and 127 pass through slotted holes in the wings 115 and 117, to provide necessary adjustments.

Figure 4:
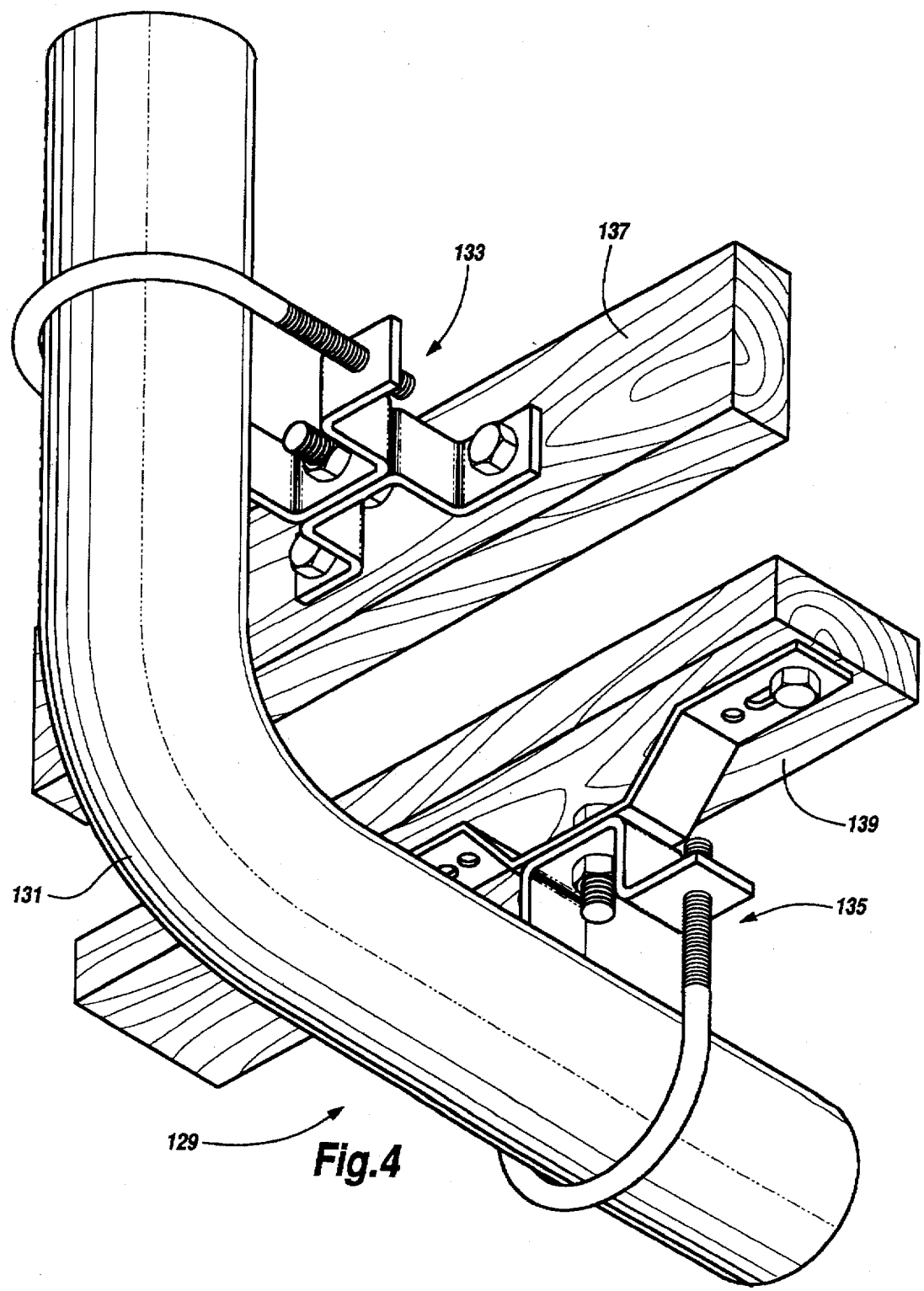
FIG. 4 is a perspective view of an adjustable pipe brace according to the invention, in which neither of the U-bolt assemblies includes spade bolts and a hinge.

In some cases, the pipe brace 11 may be attached to both a horizontal support surface and vertical support surface. In these cases, both U-bolt assemblies may be similar to the second U-bolt assembly 27. The resulting pipe brace 129 is shown in FIG. 4.

The pipe brace 129 of this embodiment includes a pipe 131 similar to the pipe 17 of the first embodiment. The first U-bolt assembly 133, supporting the vertical portion of the pipe 131, and the second U-bolt assembly 135, supporting the horizontal portion of the pipe 131, both contain the same components as the second U-bolt assembly 27 of the first embodiment. The first U-bolt assembly 133 of this embodiment is connected to a vertical support surface 137, rather than to the horizontal support surface 139.

The pipe brace of the invention has several advantages over the prior art. The pipe brace of the invention can be adjusted to the situation, whether the support surface is horizontal, vertical, or at some other angle. The pipe brace of the invention is inexpensive to manufacture, and is easy to use.

The invention has been described in only two embodiments. It should be apparent to those skilled in the art that the invention is not so limited, but is susceptible to various changes and modifications without departing from the spirit of the invention.

I claim:

1. An adjustable pipe brace for securing an antenna to a support surface, comprising:

a pipe having a vertical portion, a curved portion, and a horizontal portion;

a first U-bolt having a bight between a pair of legs;

a first clamp bracket, having a pair of wings, a pair of extension plates, attached to the wings, and a base attached between the extension plates;

a first pair of nuts for securing the first U-bolt to the wings of the first clamp bracket to hold the vertical portion of the pipe between the first U-bolt and the first clamp bracket; a first support plate;

a first nut and bolt combination for attaching the base of the first clamp bracket to the first support plate;

a first pair of screws for connecting the first support plate to the support surface;

a second U-bolt having a bight between a pair of legs;

a second clamp bracket, having a pair of wings, a pair of extension plates, attached to the wings, and a base attached between the extension plates;

a second pair of nuts for securing the second U-bolt to the wings of the second clamp bracket to hold the horizontal portion of the pipe between the second U-bolt and the second clamp bracket;

a second support plate;

a second nut and bolt combination for attaching the base of the second clamp bracket to the second support plate; and a second pair of screws for connecting the second support plate to the support surface.

2. An adjustable pipe brace as recited in claim 1, wherein the first nut and bolt combination can be loosened and retightened to allow the first clamp bracket to be pivoted relative to the first support plate.

3. An adjustable pipe brace as recited in claim 2, wherein the first nut and bolt combination has a longitudinal axis, and the first clamp bracket pivots about the longitudinal axis of the first nut and bolt combination.

4. An adjustable pipe brace as recited in claim 3, wherein the first pair of nuts can be adjusted to hold pipes of various diameters.

5. An adjustable pipe brace for securing an antenna to a support surface, comprising:

a pipe having a vertical portion, a curved portion, and a horizontal portion;

a first U-bolt having a bight between a pair of legs;

a first clamp bracket, having a pair of wings, a pair of extension plates, attached to the wings, and a base attached between the extension plates;

a first pair of nuts for securing the first U-bolt to the wings of the first clamp bracket to hold the vertical portion of the pipe between the first U-bolt and the first clamp bracket;

a first support plate;

a first nut and bolt combination for attaching the base of the first clamp bracket to the first support plate;

a pair of spade bolts attached to the first support plate and having ends spaced apart from the first support plate;

a hinge connected between the ends of the spade bolts;

a first pair of screws for connecting the hinge to the support surface;

a second U-bolt having a bight between a pair of legs;

a second clamp bracket, having a pair of wings, a pair of extension plates, attached to the wings, and a base attached between the extension plates;

a second pair of nuts for securing the second U-bolt to the wings of the second clamp bracket to hold the horizontal portion of the pipe between the second U-bolt and the second clamp bracket;

a second support plate;

a second nut and bolt combination for attaching the base of the second clamp bracket to the second support plate; and a second pair of screws for connecting the second support plate to the support surface.

6. An adjustable pipe brace as recited in claim 5, wherein the hinge can be pivoted relative to the spade bolts.

7. An adjustable pipe brace as recited in claim 6, wherein the hinge is connected to the spade bolts with a third pair of nuts and bolts.

8. An adjustable pipe brace as recited in claim 7, wherein the third pair of nuts and bolts have a longitudinal axis, and wherein the hinge pivots about the longitudinal axis of the third pair of nuts and bolts.

9. An adjustable pipe brace as recited in claim 8, wherein the spade bolts are attached to the first support plate with adjustable nuts, so that the distance between the first support plate and the hinge can be adjusted.

10. An adjustable pipe brace as recited in claim 9, wherein the first nut and bolt combination can be loosened and retightened to allow the clamp bracket to be pivoted relative to the support plate.

11. An adjustable pipe brace as recited in claim 10, wherein the first nut and bolt combination has a longitudinal axis, and the first clamp bracket pivots about the longitudinal axis of the first nut and bolt combination.

12. An adjustable pipe brace as recited in claim 11, wherein the first pair of nuts can be adjusted to hold pipe of various diameters.

* * * * *